United States Patent
Wilson et al.

(10) Patent No.: US 7,827,273 B2
(45) Date of Patent: Nov. 2, 2010

(54) MACHINE CLUSTER TOPOLOGY REPRESENTATION FOR AUTOMATED TESTING

(75) Inventors: Jared Wilson, Redmond, WA (US); Charles McClintock, Kirkland, WA (US); Peter Gerber, Munich (DE)

(73) Assignee: Microsoft Corporation, Redmond, WA (US)

( * ) Notice: Subject to any disclaimer, the term of this patent is extended or adjusted under 35 U.S.C. 154(b) by 439 days.

(21) Appl. No.: 11/691,344

(22) Filed: Mar. 26, 2007

(65) Prior Publication Data

US 2008/0244233 A1    Oct. 2, 2008

(51) Int. Cl.
*G06F 15/173*   (2006.01)
*G06F 15/177*   (2006.01)
*G06F 11/00*    (2006.01)

(52) U.S. Cl. .............................. 709/224; 714/E11.159; 714/25; 709/220

(58) Field of Classification Search ........................ None
See application file for complete search history.

(56) References Cited

U.S. PATENT DOCUMENTS

| | | | | |
|---|---|---|---|---|
| 5,371,883 A | * | 12/1994 | Gross et al. | 714/38 |
| 6,662,217 B1 | * | 12/2003 | Godfrey et al. | 709/219 |
| 6,681,389 B1 | * | 1/2004 | Engel et al. | 717/173 |
| 6,804,709 B2 | * | 10/2004 | Manjure et al. | 709/220 |
| 7,055,137 B2 | * | 5/2006 | Mathews | 717/125 |
| 7,058,858 B2 | | 6/2006 | Wong et al. | |
| 7,203,864 B2 | * | 4/2007 | Goin et al. | 714/26 |
| 2002/0184555 A1 | * | 12/2002 | Wong et al. | 714/4 |
| 2003/0103310 A1 | * | 6/2003 | Shirriff | 361/119 |
| 2004/0107414 A1 | | 6/2004 | Bronicki et al. | |
| 2005/0251716 A1 | | 11/2005 | Degrenand | |
| 2006/0080658 A1 | * | 4/2006 | Marion et al. | 717/177 |

OTHER PUBLICATIONS

Experience in Testing the Motif Interface http://ieeexplore.ieee.org/iel1/52/2484/00073746.pdf?isnumber=&arnumber=73746, pp. 26-33.
Oasys: a framework for analog circuit synthesis http://ieeexplore.ieee.org/iel2/874/3489/00123242.pdf?isnumber=&arnumber=123242, 4 pages.
DiPerF: an automated Distributed PERformance testing Framework http://people.cs.uchicago.edu/matei/papers/grid2004.pdf, 8 pages.

* cited by examiner

*Primary Examiner*—Wen-Tai Lin
(74) *Attorney, Agent, or Firm*—Merchant & Gould, P.C.

(57) ABSTRACT

Software (such as server products) operating in a complex networked environment often run on multi-machine installations that are known as machine clusters. A server product can be tested on a server machine type. The server product can be tested by tracking the constituent machines of a machine cluster, and configuring and recording the roles that each machine in the machine cluster plays. Scenarios targeting a single server machine-type can be seamlessly mapped from the single machine scenario to a machine cluster of any number of machines, while handling actions such as executing tests and gathering log files from all machines of a machine cluster as a unit.

18 Claims, 5 Drawing Sheets

MACHINE CLUSTER TOPOLOGY REPRESENTATION FOR AUTOMATED TESTING

BACKGROUND

Testing server products is difficult because many different configurations of the server are often used with the same product. Such a product may be installed with all subcomponents on a single machine, or those subcomponents may be distributed across several machines, and may also include redundancy of key subcomponents on multiple machines.

The concept of 'roles' is used to describe the required subcomponents of a product to be tested, which allows test code to target specific roles without knowledge of the machine(s) on which the roles were installed. However, in order to execute a test using this feature, the tester was usually required to set up an appropriate XML configuration file (known as the topology XML) on each machine to describe which roles the machine should fill.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

The present disclosure is directed to testing server products in more complex multi-machine installations (known as machine clusters) of server products. A server product can be tested on a server machine type. In order for the server product to be tested, the constituent machines of a machine cluster are tracked, and the roles that each machine in the machine cluster plays are configured and recorded. Thus a scenario targeting a single server machine type can be seamlessly mapped from the single machine scenario to a machine cluster of any number of machines, while properly handling actions such as executing tests and gathering log files from all machines of a machine cluster as a unit.

Automatic machine cluster allocation allows a test written for a specific role to be tested against any cluster of machines that fulfill the specific role. In response to the request for a configuration, the system is able to determine the number of machines required, select from the available machines, and perform the necessary actions to configure all of the cluster machines for performing the role required by the server product to be tested.

The representation of machine clusters is stored so that the tester can know which configurations have been tested. The machine clusters typically comprise a primary machine and one or more secondary machines. As a machine cluster is configured, each machine in the machine cluster is normally assigned a value so that the collection of roles installed on that machine can be uniquely identified.

Atomicity of machine clusters extends from the primary/secondary structure of the machine cluster. Any action that takes place against the primary machine is normally automatically extended to perform all necessary actions across the entire machine cluster.

Scripts for performing the actions can be dynamically extended. Whenever a test script is assigned to execute against a primary machine, the test script can be instantiated multiple times and executed in parallel against all of the machines in the cluster. The separate results are processed, and a final aggregate result can be produced, which allows the test execution to behave indistinguishably regardless of the actual number of machines involved in a machine cluster.

These and other features and advantages will be apparent from a reading of the following detailed description and a review of the associated drawings. It is to be understood that both the foregoing general description and the following detailed description are explanatory only and are not restrictive. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The disclosure herein is, therefore, not to be taken in a limiting sense.

DETAILED DESCRIPTION

Figure 1:
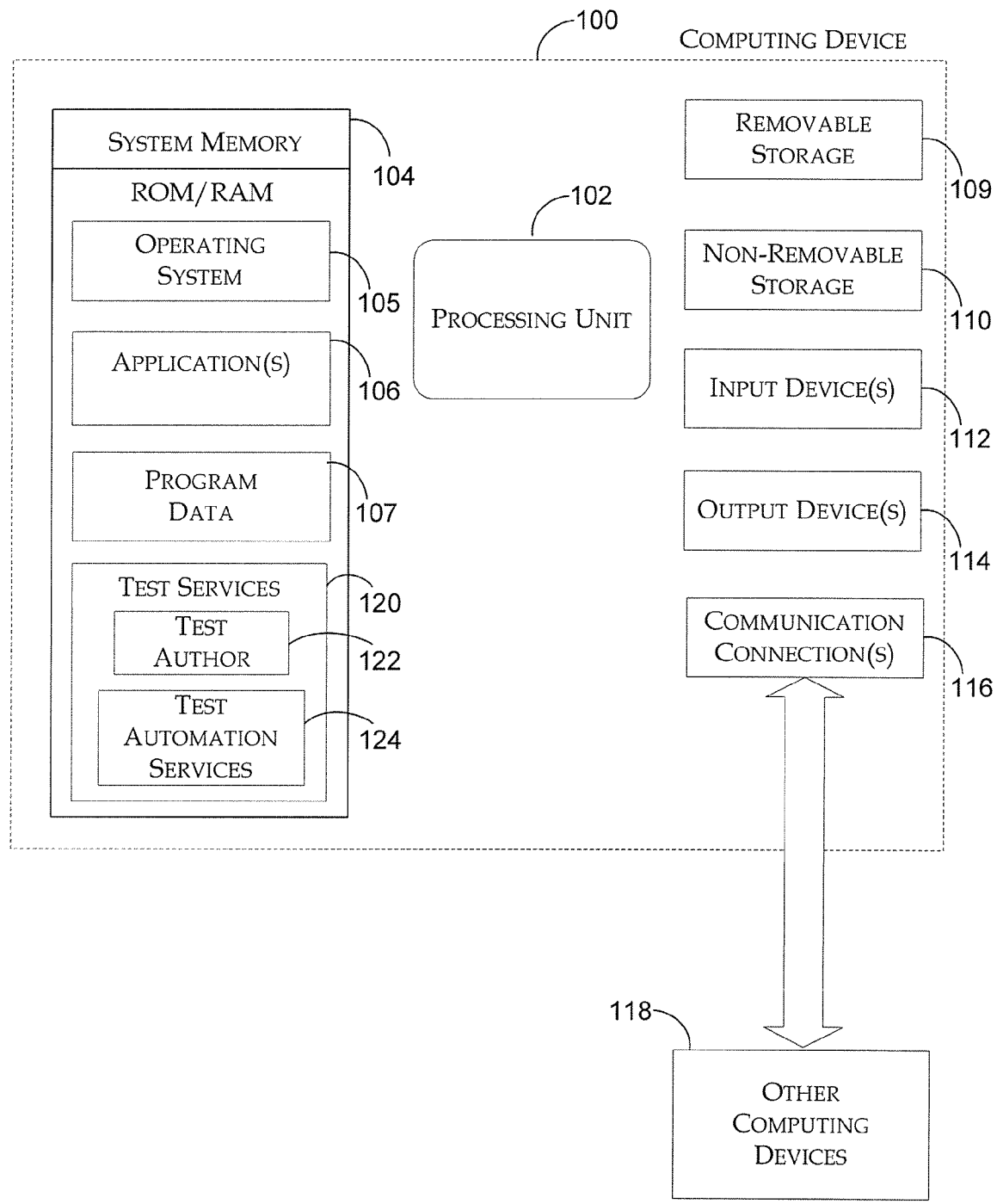
FIG. 1 is an illustration of an example operating environment and system for representing the topology of machine clusters.

As briefly described above, embodiments are directed to dynamic computation of identity-based attributes. With reference to FIG. 1, one example system representing the topology of machine clusters for automated testing includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107 such that data store monitor 120, attribute computer 122, and cache 124 can be implemented (which are discussed below).

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In accordance with the discussion above, computing device 100, system memory 104, processor 102, and related peripherals can be used to implement test services 120. Test services 120 in an embodiment can be used for testing and verification of both systems and products for the systems (described below). Test services 120 (as well as test author 122 and test automation system 124) can be implemented using single or multiple processors, on a single computer or distributed across many computers.

Test author 122 is a test authoring framework, which can be implemented as .NET framework-based solution that allows testers to write compileable managed code tests. Each method in the test code can become an operation of test-through attributes of each test. The test-through attributes also allow the test methods to target specific 'roles' to be employed for a machine (or machines) in a test. When one of the tests is run against a machine, a configuration XML file, known as the topology XML, maps the subcomponents of a product that are installed on that machine to these role names. Test methods that target specific roles normally only execute on machines whose topology XML indicates that the corresponding subcomponents are installed. For purposes of the test authoring framework tests, the topology XML file has been typically statically generated by the user.

Test automation system 124 typically comprises a database for storing all test-related information, a network-based ("web") UI (user-interface) for users to interact with the system, a collection of web services for performing many of the system's tasks one or more "controllers" (which are applications in charge of managing machines and distributing tests), and a collection of machines. Each machine typically executes a test harness application that allows the machine to communicate with the rest of the system and that allows the machine to execute tests.

Figure 2:
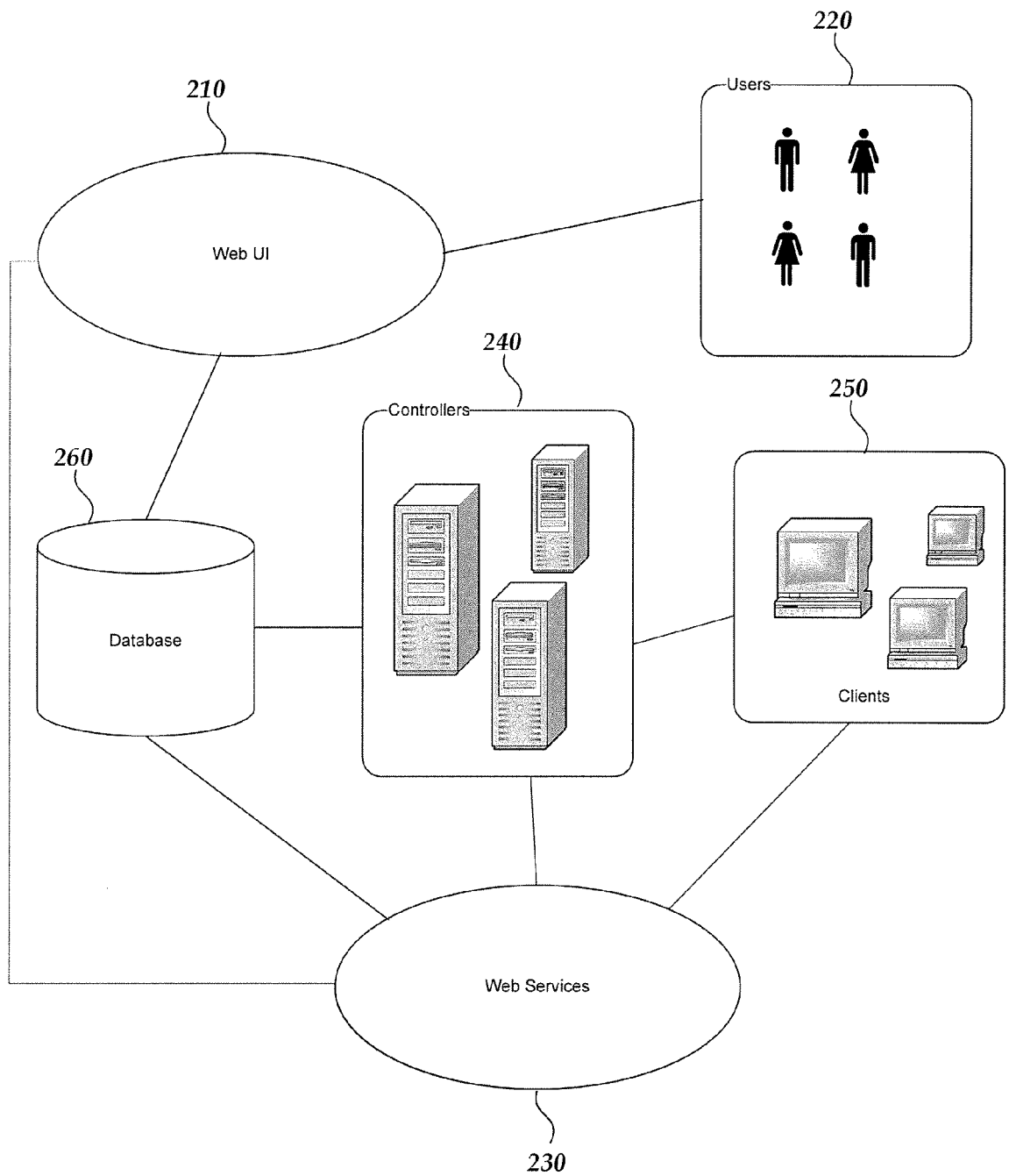
FIG. 2 is a schematic diagram illustrating a system for providing automated test services.

FIG. 2 is a schematic diagram illustrating a system for providing automated test services. The web UI 210 allows users 220 (who are usually "testers") to associate their test code with the system as a "scenario." The web UI 210 is configured to pass the associated test code to web service 230. Web service 230 can be a .Net-based service that exposes, for example, a test interface for available services. Web service 230 communicates with controllers 240, clients 250, and database 260 to configure and execute tests (as is discussed more fully with reference to accompanying figures). The controllers can be used to send configuration instructions to clients 250, and store associated results in database 260 for subsequent communication with the users 220 via the web UI 210.

A tester can select an option to execute any number of scenarios in a "job," by choosing target machines or groups of machines on which to execute those tests. The test automation system 124 typically provides useful features such as load-balancing of tests across multiple machines, and automatic reconfiguration of machines used by the tests. Test automation system 124 allow for the automatic allocation of machines, rather than requiring the user to select specific machines.

To illustrate the intricacies of the interaction between the test author 122 and the test authoring system, an example is given. For example, a tester may have written a test using test author 122 to validate a feature of a messaging product on a server. For purposes of testing (and this example), the messaging product install can be considered to consist of several subcomponents: a Web Front End (WFE) that a user might interact with, a SQL Server database for storing the data of the messaging product's web sites, and an Indexing Service that runs in the background to ensure optimized searching for data within the messaging product. The user's test typically comprises a setup method that populates data into the SQL Server subcomponent, a second setup method which adjusts the configuration of the Indexing Service, and a test method that attempts to access the data via the WFE.

As the example continues, the tester then uses the test automation system 124, to associate a test with a scenario that targets the "Server" machine type. The tester submits a request to execute the scenario against a chosen configuration of the product. The test automation system 124 receives the request, and verifies the chosen configuration. From data stored in the test automation system database 230, the test automation system 124 determines that the configuration comprises three machines, one for each of the above-listed roles of the messaging product. The test automation system 124 selects three machines, associates them as a machine cluster, assigns a role to each, and configures the machines with the messaging product.

The test automation system 124 then proceeds to the scenario execution, which in the example determines that the target "Server" is actually a machine cluster of three machines. It can "on-the-fly" split the scenario three ways, by sending a duplicate copy of the test (as well as the topology XML data required by the test framework) to each machine of the cluster. Each machine executes the test (by using the topology XML data to determine which portions of the test code to execute), and then returns the resulting log files. The test automation system 124 usually waits to receive each result, which the system can merge back into a final outcome. The final outcome is the report that is typically reported by the system back to the tester. The tester can then execute this scenario again, but by (for example) choosing a configuration that consists of one, two, or any other number of machines.

As described in the above example, the concept of the "machine cluster" is used to map from the test automation system's viewpoint of individual target machines to the test author's ability to run as a unit against multiple machine (when provided with the appropriate topology XML). A machine cluster can be simply a record that consists of two or more machines that can behave as a single unit. In practice, a machine cluster can be represented by a primary machine, and an associated set of secondary machines. Each primary or secondary machine has an associated set of roles, which can be represented as a simple string that describes each of the roles' names.

The concept of machine clusters applies to various stages throughout the testing process: the automatic selection of machines by the system, the configuring of the selected machines, the execution of tests against the machines, and the processing and recording of the results. In configurations where machine clusters are not desired, many other areas of code do not need to be changed (including the selection of tests) to allow the test to also run against a non-machine cluster implementation. This means that the same tests can be executed in a non-machine cluster configuration as well as executed against a machine cluster (as long as they have been written using the concept of roles as described above).

Figure 3:
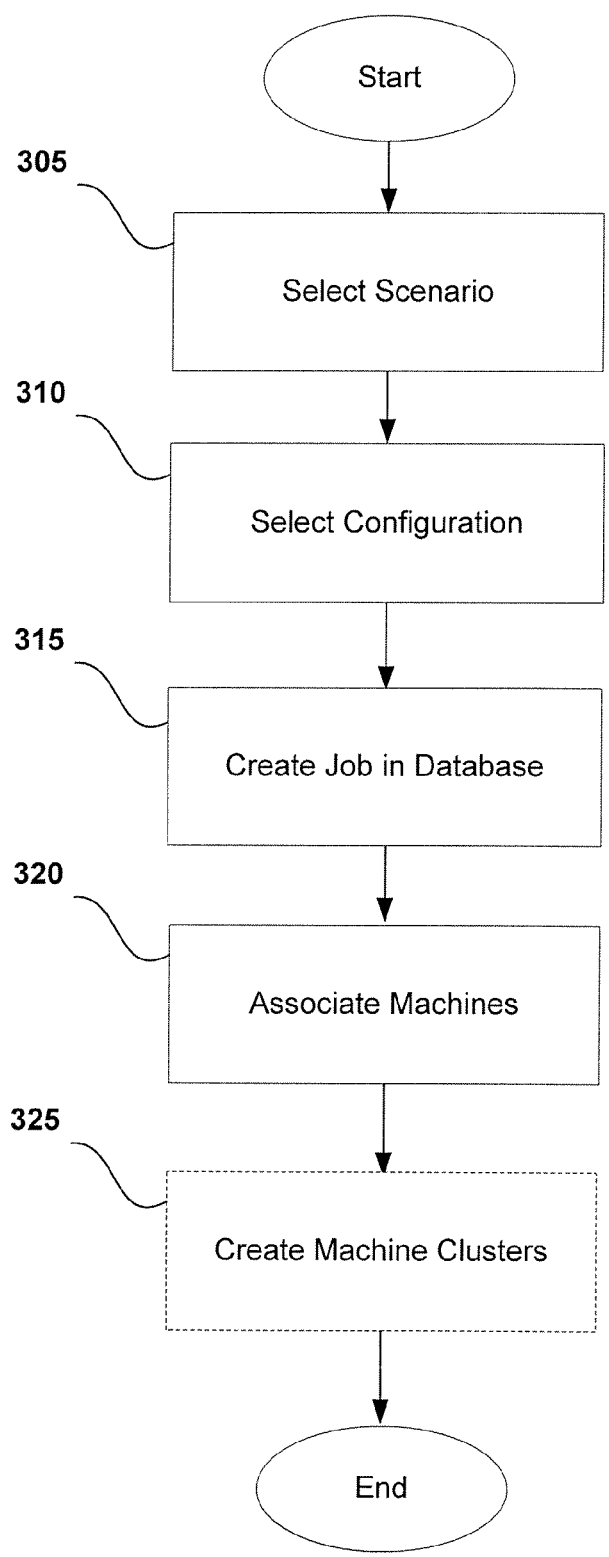
FIG. 3 is a flow diagram illustrating machine selection in machine cluster-based test services.

FIG. 3 is a flow diagram illustrating machine selection in machine cluster-based test services. In operation 305, a user (who may be a tester) selects a set of scenarios to be executed. A web UI (or any other suitable interface) can be used. In operation 310, a user selects product configurations against which to execute those scenarios. The same UI (or any other suitable interface) can be used. The user can explicitly chose the configuration or can allow the system to choose the machine resources in accordance with the test requirements as specified in the desired machine configurations. When one or more of the chosen configurations corresponds to a product installed on two or more machines, a machine cluster is indicated.

In operation 315, the web service portion of the test operation system receives the request for the scenarios and configurations and creates a job in the database. In operation 320, the web service selects machines for execution and associates them as targets for the job. As machines are chosen for each configuration, the system looks up the underlying configuration details for each configuration from the database. When the details indicate a single-machine configuration, it can skip operation 325. In operation 325 (where two or more machines are implicated), the system creates a new machine cluster entry in the database, and selects one machine as the primary machine. It then proceeds to select the remaining quantity of machines and associates each as a secondary machine for that machine cluster. The primary machine is associated as a machine targeted by the job, while the secondary machines are set aside to preclude their use by any other process. This process can be repeated until the needed number of machine clusters is prepared. At this point, no machines in the machine cluster typically have any roles associated with them. Once the machine processing is complete, processing can continue as described in FIG. 4.

Figure 4:
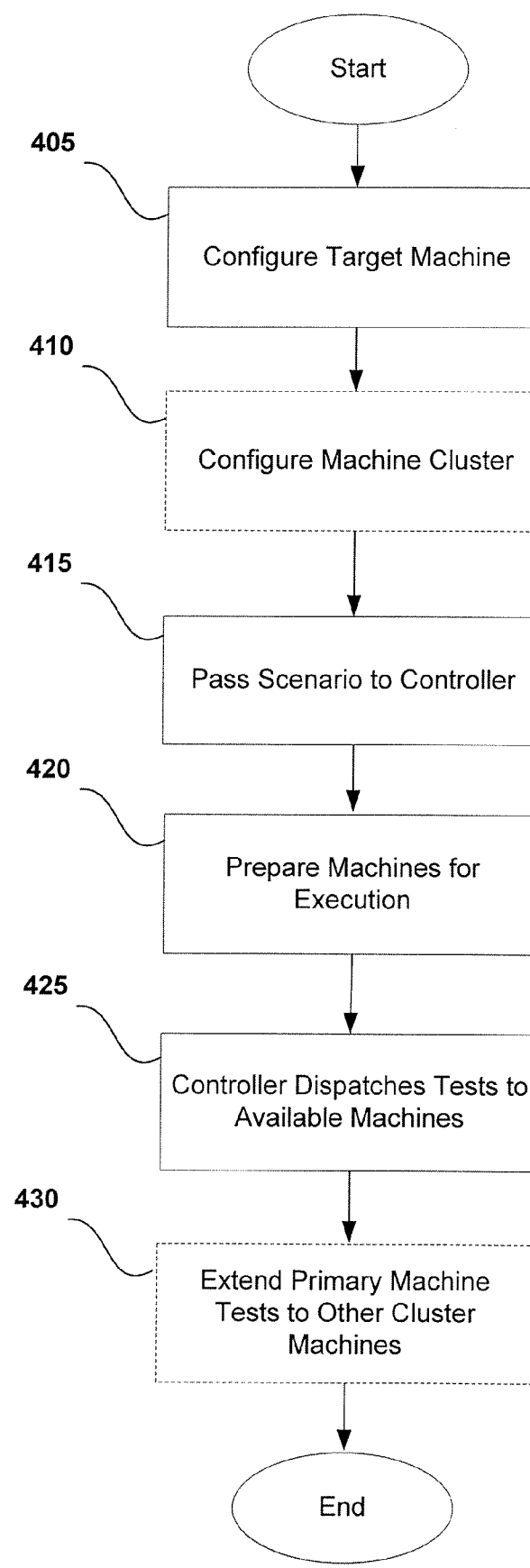
FIG. 4 is a flow diagram illustrating machine configuration in machine cluster-based test services.

FIG. 4 is a flow diagram illustrating machine configuration in machine cluster-based test services. In operation 405, the web service checks each targeted machine for the required configuration, determines the steps to install the product(s) in that configuration, and the order in which the steps can execute. In operation 410, the web service optionally extends the configuration and preparation to any present machine clusters. For machines that are not part of a machine cluster, no additional logic is necessary. Secondary machines do not need to be checked at this point, because they are not directly associated as targets for the job. In operation 415, the controller portion of the web service readies both the primary and the secondary machines for configuration. In operation 420, the web service determines any steps that need to be taken on an individual machine basis for each machine, such as wiping the machine to a fresh OS (operating system) image.

The web service determines the install scenario(s) to configure the product on the set of machines in the cluster. From the given scenario, the web service extracts the data of which roles will be installed to each machine, and associates those roles with the machines in the cluster. When the machines have received the dispatched configuration steps, the planned configuration steps are started. Once the machine configuration is complete, tests can be dispatched to the machines of the machine cluster.

In operation 425, the controller begins dispatching tests to available machines. Once machine configuration has completed, the machines are ready to begin executing tests. This triggers each of the machines to be dispatched by the controller. When a non-cluster machine is dispatched, it is first checked if it is in an available state. If it is, the first waiting scenario targeting it is found, and execution is begun by sending the scenario's information to the machine.

In operation 430, a cluster machine (if any) is dispatched and checked for availability, as are all other machines in the cluster. A cluster considered available normally only if all machines in the cluster are found to be available. If available, the first waiting scenario targeting the primary machine is found. The scenario is normally duplicated for each machine in the machine cluster, which can be tracked by recording the machine cluster into the database alongside the scenario to be executed. The scenario's information can be then sent to each of the machines in the machine cluster, along with the information needed to generate the topology XML. Once the machine configuration and test dispatching is complete, processing can continue as described in FIG. 5.

Figure 5:
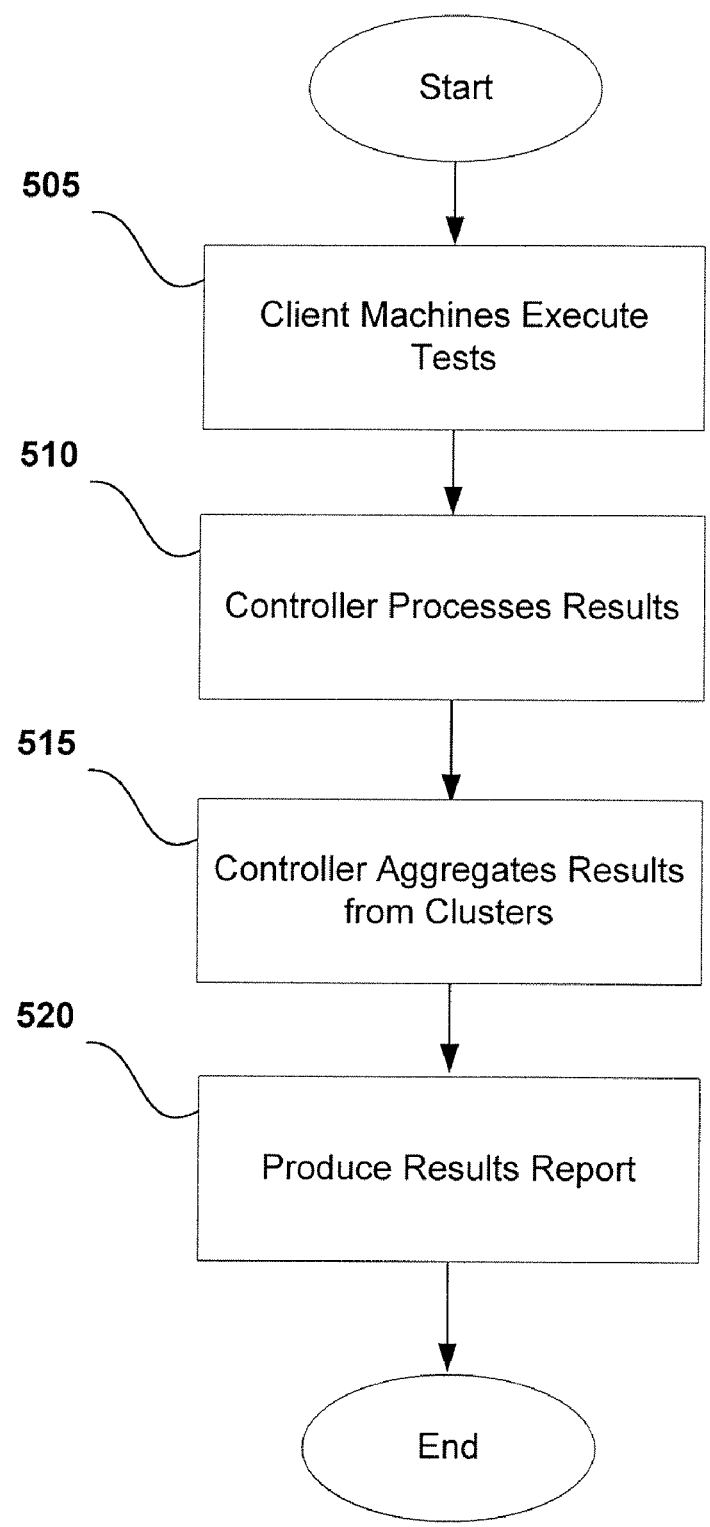
FIG. 5 is a flow diagram illustrating the execution of tests in machine cluster-based test services.

FIG. 5 is a flow diagram illustrating the execution of tests in machine cluster-based test services. In operation 505, the client machines execute the test code accordingly (using the topology XML to determine which test methods should execute on which machines). After test execution is complete, each machine sends its individual results back up to the controller for final processing. In operation 510, the controller processes the results individually for non-clustered cases and the result data is recorded as is into the database. In operation 515, the system processes each clustered machine's results (if any) as the results are returned. Once all machines in the machine cluster have returned results and been processed, processing continues in operation 520.

In operation 520, the system aggregates the data about the results, including first failures and other relevant statistics, and can record a single set of result data into the database for the scenario. After this point in both the clustered or non-clustered case, all machines involved in the execution typically have their status returned to availability and a new dispatch attempt can be triggered. The dispatch and execution process can be then repeated until all scenarios have completed, and a final results mail can be generated and sent back to the user to display the final statistics of the job.

In various embodiments, machine clusters can be associated with a single job. Thus, if a machine in a cluster attempts to dispatch for a scenario in any other job, the machine cluster can be treated as being non-clustered for various purposes. Accordingly, the logic for machine clustering is normally only triggered when dispatching to a scenario from the job that is associated with the machine cluster.

The above specification, examples and data provide a complete description of the manufacture and use of embodiments of the invention. Since many embodiments of the invention can be made without departing from the spirit and scope of the invention, the invention resides in the claims hereinafter appended.

We claim:

1. A computer-implemented method for automated testing, comprising:
    determining a scenario of a role to be tested by execution of a test on one or more machines of a machine cluster;
    after determining the scenario to be tested, automatically determining a number of machines and the machines within the machine cluster for performing the role within the scenario; wherein the role within the scenario is performed using one machine in a first configuration and more than one machine in a second configuration;
    selecting one of the machines as a primary machine and setting the other machines as secondary machines; wherein the primary machine is associated as a machine targeted by the role to be tested and each of the secondary machine also has an associated role for the test;
    dispatching the test to a primary machine of the determined cluster;
    extending the dispatched test from the primary machine of the determined cluster to secondary machines of the determined cluster;
    executing the dispatched and extended tests; and
    aggregating the results of the execution of the dispatched and extended tests for display to a user wherein an action directed to the primary machine in the machine cluster is extended to all secondary machines in the machine cluster; wherein a script directing action to the primary machine is instantiated multiple times and executed in parallel against all of the machines in the machine cluster.

2. The method of claim 1 wherein the role is performed by a network server product.

3. The method of claim 2 wherein the role is performed by a cluster of machines running the network server product.

4. The method of claim 1 further comprising executing the method of claim 1 for different roles to be executed on different machine clusters.

5. The method of claim 1 further comprising determining the number of machines in a cluster required to perform the role in response to a request for a configuration to execute the test to perform the role.

6. The method of claim 1 further comprising storing a configuration of the determined machine cluster.

7. The method of claim 6 wherein the stored configuration comprises an identification of the test for which the machine cluster was determined.

8. The method of claim 1 wherein log files for each secondary machine are stored in response to the execution of the extended tests.

9. The method of claim 8 wherein the log files are processed separately to produce a final aggregate result that does not vary in response to the actual number of machines of the machine cluster.

10. A system for automated testing of server products, comprising:
    a user interface for receiving a selected test scenario from a user and for displaying results of execution of the selected test scenario;
    a service manager for automatically selecting a number of machines for a machine cluster after receiving the selected test scenario; wherein the number of machines for testing the selected test scenario change depending on a configuration; where the test scenario uses one machine in a first configuration and more than one machine in a second configuration wherein each of the machine in the cluster has an associated role for the test;
    a controller for dispatching tests associated with the selected scenario to the selected machines of the machine cluster; and
    a database for storing individual results of execution of the dispatched tests on each selected machine of the machine cluster wherein an action directed to a primary machine in the machine cluster is extended to all other machines in the machine cluster; wherein a script directing action to the primary machine is instantiated multiple times and executed in parallel against all of the machines in the machine cluster.

11. The system of claim 10 wherein the user interface is a web-based interface.

12. The system of claim 10 wherein the service manager exposes web-based services to the user interface.

13. The system of claim 10 wherein the service manager generates install scenarios and passes the install scenarios to the controller 14. The system of claim 10 wherein the controller produces an aggregate result after all selected machines of the machine cluster return results for the dispatched and extended tests.

15. The system of claim 14 wherein the aggregate result is communicated with the user via an email message.

16. A tangible computer-readable electronic storage medium comprising computer-executable instructions for:
    receiving commands from a user to execute a scenario that comprise tests for performing roles associated with each test;
    after receiving the commands to execute the scenario, automatically determining a machine cluster for executing the tests and a number of machines within the machine cluster;
    wherein the number of machines for executing the selected test scenario change depending on a configuration; wherein executing the test scenario uses one machine in a first configuration and more than one machine in a second configuration wherein each of the machine in the cluster has an associated role for the test;
    dispatching the test to a primary machine of the determined cluster;
    extending the dispatched test from the primary machine of the determined cluster to secondary machines of the determined cluster;
    executing the dispatched and extended tests; and
    aggregating the results of the execution of the dispatched and extended test for display to a user wherein an action directed to the primary machine in the machine cluster is extended to all secondary machines in the machine cluster; wherein a script directing action to the primary machine is instantiated multiple times and executed in parallel against all of the machines in the machine cluster.

17. The tangible medium of claim 16 further comprising using web-based systems to communicate the result with the user.

18. The tangible medium of claim 16 further comprising decoding machine cluster topologies in an extensible markup language.

* * * * *